United States Patent
Bennett et al.

(10) Patent No.: US 10,649,661 B2
(45) Date of Patent: May 12, 2020

(54) DYNAMICALLY RESIZING LOGICAL STORAGE BLOCKS

(71) Applicant: Western Digital Technologies, Inc., San Jose, CA (US)

(72) Inventors: Alan Bennett, Edinburgh (GB); Sergei Gorobets, Edinburgh (GB); Liam Parker, Edinburgh (GB)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 208 days.

(21) Appl. No.: 15/633,608

(22) Filed: Jun. 26, 2017

(65) Prior Publication Data

US 2018/0373438 A1 Dec. 27, 2018

(51) Int. Cl.
*G06F 3/06* (2006.01)
*G06F 12/02* (2006.01)

(52) U.S. Cl.
CPC ............ *G06F 3/0608* (2013.01); *G06F 3/064* (2013.01); *G06F 3/0652* (2013.01); *G06F 3/0655* (2013.01); *G06F 3/0679* (2013.01); *G06F 12/0246* (2013.01); *G06F 2212/7201* (2013.01)

(58) Field of Classification Search
CPC .... G06F 3/0608; G06F 3/0652; G06F 3/0655; G06F 3/0679; G06F 12/0246; G06F 2212/7201
See application file for complete search history.

(56) References Cited

U.S. PATENT DOCUMENTS

| | | | | |
|---|---|---|---|---|
| 8,713,066 | B1* | 4/2014 | Lo | G06F 12/0246 707/673 |
| 2005/0144516 | A1* | 6/2005 | Gonzalez | G06F 12/0246 714/6.13 |
| 2007/0260837 | A1* | 11/2007 | Hsu | G06F 12/1441 711/163 |
| 2008/0052446 | A1 | 2/2008 | Lasser et al. | |
| 2008/0104308 | A1* | 5/2008 | Mo | G06F 12/0246 711/103 |
| 2009/0287875 | A1* | 11/2009 | Lin | G06F 12/0246 711/103 |
| 2010/0017556 | A1* | 1/2010 | Chin | G06F 12/0246 711/103 |

(Continued)

*Primary Examiner* — William E. Baughman
(74) *Attorney, Agent, or Firm* — Kunzler Bean & Adamson, PC

(57) ABSTRACT

Apparatuses, systems, methods, and computer program products are disclosed for dynamically resizing logical storage blocks. A controller for a non-volatile storage device includes a block component that determines a total number of available erase blocks of the non-volatile storage device. A controller for a non-volatile storage device includes a size module that determines numbers of erase blocks from available erase blocks to include in each of a plurality of logical blocks as a function of a total number of available erase blocks such that the numbers of erase blocks for each of the logical blocks deviates from each other by less than a predetermined deviation limit. A controller for a non-volatile storage device includes a map module that generates logical blocks for the non-volatile storage device by assigning determined numbers of erase blocks to each of the logical blocks.

18 Claims, 9 Drawing Sheets

(56) References Cited

U.S. PATENT DOCUMENTS

| | | | |
|---|---|---|---|
| 2010/0017557 A1* | 1/2010 | Nakanishi | G06F 12/0246 711/103 |
| 2010/0228907 A1* | 9/2010 | Shen | G06F 12/0246 711/103 |
| 2011/0078402 A1* | 3/2011 | Sato | G06F 12/0246 711/166 |
| 2012/0047409 A1 | 2/2012 | Post et al. | |
| 2013/0205102 A1* | 8/2013 | Jones | G06F 12/0246 711/154 |
| 2014/0164679 A1* | 6/2014 | Manohar | G06F 12/0246 711/103 |
| 2014/0164730 A1* | 6/2014 | Gold | G06F 3/0608 711/171 |
| 2014/0359382 A1* | 12/2014 | Choi | G06F 11/2094 714/710 |
| 2015/0067415 A1* | 3/2015 | Miyamoto | G06F 11/076 714/704 |
| 2015/0074333 A1* | 3/2015 | Yao | G06F 12/0246 711/103 |
| 2015/0339070 A1* | 11/2015 | Lee | G06F 3/0619 711/103 |
| 2016/0004464 A1* | 1/2016 | Shen | G06F 3/0653 711/103 |
| 2016/0274802 A1* | 9/2016 | Koo | G06F 3/0616 |
| 2018/0068731 A1* | 3/2018 | Kim | G11C 16/26 |
| 2018/0151251 A1* | 5/2018 | Oh | G06F 3/0619 |

\* cited by examiner

DYNAMICALLY RESIZING LOGICAL STORAGE BLOCKS

TECHNICAL FIELD

The present disclosure, in various embodiments, relates to storage devices and more particularly relates to dynamically resizing logical storage blocks.

BACKGROUND

Erase blocks of a storage device may be logically grouped together to form logical storage blocks. The number of erase blocks included in each logical storage block may vary based on the number of bad blocks that are present in the storage device due to manufacturing defects, and may adjust over time as erase blocks become unusable, which may cause the sizes of the logical storage blocks to change.

SUMMARY

Apparatuses are presented to dynamically resize logical storage blocks. In one embodiment, an apparatus includes a controller for a non-volatile storage device. A controller for a non-volatile storage device, in one embodiment, includes a block component that determines a total number of available erase blocks of the non-volatile storage device. A controller for a non-volatile storage device, in further embodiments, includes a size module that determines numbers of erase blocks from available erase blocks to include in each of a plurality of logical blocks as a function of a total number of available erase blocks such that the numbers of erase blocks for each of the logical blocks deviates from each other by less than a predetermined deviation limit. A controller for a non-volatile storage device, in certain embodiments, includes a map module that generates logical blocks for the non-volatile storage device by assigning determined numbers of erase blocks to each of the logical blocks.

An apparatus, in another embodiment, includes means for identifying a pool of erase blocks of a non-volatile recording medium to assign to a plurality of virtual blocks. In some embodiments, each of a plurality of virtual blocks includes a plurality of erase blocks that are logically combined to form a single storage unit of a non-volatile recording medium. In one embodiment, an apparatus includes means for calculating sizes for each of a plurality of virtual blocks where the sizes define a number of erase blocks to assign to each of the plurality of virtual blocks. In one embodiment, an apparatus includes means for assigning erase blocks from a pool of erase blocks to virtual blocks such that variations in sizes between each virtual block is less than twenty-five percent.

Systems are presented to dynamically resize logical storage blocks. A system, in one embodiment, includes a non-volatile memory device that includes a plurality of erase blocks. In certain embodiments, a controller for a non-volatile memory device is configured to perform operations for determining how many of a plurality of erase blocks are available for creating super blocks. In some embodiments, super blocks are storage units of a non-volatile memory device that are comprised of a combination of a plurality of erase blocks. In one embodiment, a controller for a non-volatile memory device is configured to perform operations for generating a mapping of usable erase blocks to the super blocks such that a number of usable erase blocks that are mapped to each of the super blocks varies by less than a threshold size. In one embodiment, a controller for a non-volatile memory device is configured to perform operations for periodically modifying a mapping of useable erase blocks to super blocks while ensuring that a number of usable erase blocks that are mapped to each of the super blocks varies by less than a threshold size.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
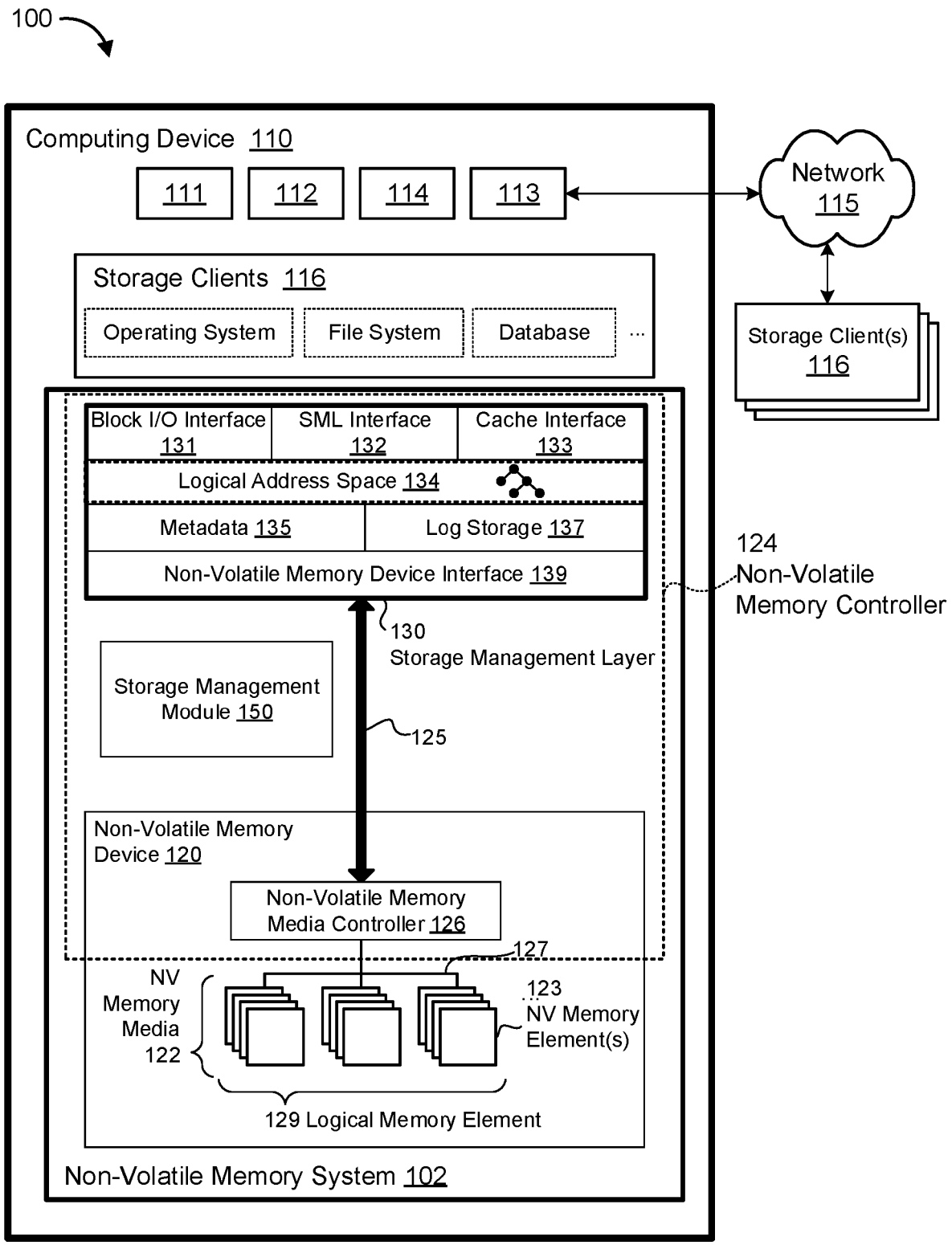
FIG. 1 is a schematic block diagram illustrating one embodiment of a system comprising a storage management module.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 comprising a storage management module 150. The storage management module 150 may be part of and/or in communication with one or more of a non-volatile memory controller 124, a non-volatile memory media controller 126, a device driver or storage management layer (SML) 130, or the like. The storage management module 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 124 to a communication network 115, such as an Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the storage management module 150 may be embodied as one or more computer readable instructions stored on the non-transitory storage media 114.

The non-volatile memory system 102, in the depicted embodiment, includes a storage management module 150. The storage management module 150, in one embodiment, is configured to determine a total number of available or useable erase blocks of a non-volatile memory device 120, and to determine how many of the available erase blocks may be grouped together to form multiple logical storage blocks such that the numbers of erase blocks that are included in each logical storage block does not deviate from each other by less than a predetermined amount, percentage, or the like. The storage management module 150, in a further embodiment, generates the multiple logical storage blocks by assigning the determined numbers of erase blocks to each of the multiple logical storage blocks.

In this manner, in certain embodiments, the storage management module 150 may maintain logical storage blocks that have small variations in their sizes (e.g., in the number of useable erase blocks that are assigned to the logical storage blocks) and therefore have small variations in parallelism (e.g., to provide consistent bandwidth for a host device) for performing operations in parallel such as reading, writing, programming, and/or the like, with consistent degrees of parallelism. Furthermore, by reducing the variation in the numbers of erase blocks that are assigned to each of the logical storage blocks, the storage management module 150 may ensure that substantially all of the available and useable erase blocks, e.g., the good erase block capacity, are assigned to logical storage blocks. This is unlike conventional methods for generating logical storage blocks that may focus on creating as many, and only, full-size logical storage blocks as possible, or creating as many full-size logical storage blocks as possible and then using the remaining erase blocks to create smaller, down to half-size, logical storage blocks. In either case, there may be a number of remaining good erase blocks that cannot be used to form logical storage blocks, and there may be a large variation in the logical storage block sizes, which may create a high parallelism variation and decreased performance.

In one embodiment, the storage management module 150 may comprise executable software code, such as a device driver, SML 130, or the like, stored on the computer readable storage media 114 for execution on the processor 111. In another embodiment the storage management module 150 may comprise logic hardware of one or more non-volatile memory devices 120, such as a non-volatile memory media controller 126, a non-volatile memory controller 124, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the storage management module 150 may include a combination of both executable software code and logic hardware.

In one embodiment, the storage management module 150 is configured to receive storage requests from the SML 130 via a bus 125 or the like. The storage management module 150 may be further configured to transfer data to/from the SML 130 and/or storage clients 116 via the bus 125. Accordingly, the storage management module 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the storage management module 150 may receive storage requests as an API call from a storage client 116, as an IO-CTL command, or the like. The storage management module 150 is described in greater detail below with regard to FIGS. 4 and 5.

According to various embodiments, a non-volatile memory controller 124 comprising the storage management module 150 may manage one or more non-volatile memory devices 120. The non-volatile memory device(s) 120 may comprise recording, memory, and/or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, erase blocks, sectors, blocks, collections or sets of physical storage locations (e.g., logical pages, logical erase blocks, described below), or the like.

The non-volatile memory controller 124 may comprise an SML 130, which may present a logical address space 134 to one or more storage clients 116. One example of an SML is the Virtual Storage Layer® of SanDisk Corporation of Milpitas, Calif. Alternatively, each non-volatile memory device 120 may comprise a non-volatile memory media controller 126, which may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML 130 may maintain metadata 135, such as a forward index, to map logical addresses of the logical address space 134 to media storage locations on the non-volatile memory device(s) 120. The SML 130 may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML 130 may map logical addresses to physical data resources of any size and/or granularity, which may or may not correspond to the underlying data partitioning scheme of the non-volatile memory device(s) 120. For example, in some embodiments, the non-volatile memory controller 124 is configured to store data within logical memory units that are formed by logically combining a plurality of physical memory units, which may allow the non-volatile memory controller 124 to support many different virtual memory unit sizes and/or granularities.

As used herein, a logical memory element refers to a set of two or more non-volatile memory elements that are or are capable of being managed in parallel (e.g., via an I/O and/or control bus), which may otherwise be known as a logical storage block, a virtual storage block, and/or a super block. A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (e.g., each non-volatile memory element being accessible in parallel). As used herein, a logical memory division refers to a set of two or more physical memory divisions, each physical memory division on a respective non-volatile memory element in the respective logical memory element.

The logical address space 134 presented by the SML 130 may have a logical capacity, which may correspond to the number of available logical addresses in the logical address space 134 and the size and/or granularity of the data referenced by the logical addresses. For example, the logical capacity of a logical address space 134 comprising $2^{32}$ unique logical addresses, each referencing 2048 bytes (2 KiB) of data may be $2^{43}$ bytes. As used herein, a kibibyte (KiB) refers to 1024 bytes. In some embodiments, the logical address space 134 may be thinly provisioned. As used herein, a "thinly provisioned" logical address space 134 refers to a logical address space 134 having a logical capacity that exceeds the physical capacity of the underlying non-volatile memory device(s) 120. For example, the SML 130 may present a 64-bit logical address space 134 to the storage clients 116 (e.g., a logical address space 134 referenced by 64-bit logical addresses), which may exceed the physical capacity of the underlying non-volatile memory devices 120. The large logical address space 134 may allow storage clients 116 to allocate and/or reference contiguous ranges of logical addresses, while reducing the chance of naming conflicts. The SML 130 may leverage the any-to-any mappings between logical addresses and physical storage resources to manage the logical address space 134 independently of the underlying physical storage devices 120. For example, the SML 130 may add and/or remove physical storage resources seamlessly, as needed, and without changing the logical addresses used by the storage clients 116.

The non-volatile memory controller 124 may be configured to store data in a contextual format. As used herein, a contextual format refers to a self-describing data format in which persistent contextual metadata is stored with the data on the physical storage media 122. The persistent contextual metadata provides context for the data with which it is stored. In certain embodiments, the persistent contextual metadata uniquely identifies the data with which the persistent contextual metadata is stored. For example, the persistent contextual metadata may uniquely identify a sector or block of data owned by a storage client 116 from other sectors or blocks of data owned by the storage client 116. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data.

The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media 122, a memory division index, or the like).

In some embodiments, the contextual data format may allow data context to be determined and/or reconstructed based upon the contents of the non-volatile memory media 122, and independently of other metadata, such as the arbitrary, any-to-any mappings discussed above. Since the media location of data is independent of the logical address of the data, it may be inefficient or impossible to determine the context of data based solely upon the media location or media address of the data. Storing data in a contextual format on the non-volatile memory media 122 may allow data context to be determined without reference to other metadata. For example, the contextual data format may allow the metadata to be reconstructed based only upon the contents of the non-volatile memory media 122 (e.g., reconstruct the any-to-any mappings between logical addresses and media locations).

In some embodiments, the non-volatile memory controller 124 may be configured to store data on one or more asymmetric, write-once media 122, such as solid-state storage media. As used herein, a "write once" storage medium refers to a storage medium that is reinitialized (e.g., erased) each time new data is written or programmed thereon. As used herein, an "asymmetric" storage medium refers to a storage medium 122 having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media).

The memory media 122 may be partitioned into memory divisions that may be erased as a group (e.g., erase blocks) in order to, inter alia, account for the asymmetric properties of the media 122 or the like. As such, modifying a single data segment in-place may require erasing the entire erase block comprising the data, and rewriting the modified data to the erase block, along with the original, unchanged data. This may result in inefficient "write amplification," which may excessively wear the media 122. Therefore, in some embodiments, the non-volatile memory controller 124 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied.

Moreover, writing data out-of-place may remove erasure from the latency path of many storage operations (e.g., the erasure latency is no longer part of the critical path of a write operation).

The non-volatile memory controller 124 may comprise one or more processes that operate outside of the regular path for servicing of storage operations (e.g., the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client 116, identifying the logical addresses of the request, performing one or more storage operations on non-volatile memory media 122, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller 124 comprises a groomer, which is configured to reclaim memory divisions (e.g., logical or physical erase blocks) for reuse, using a garbage collection or other storage capacity recovery process. The write out-of-place paradigm implemented by the non-volatile memory controller 124 may result in obsolete or invalid data remaining on the non-volatile memory media 122. For example, overwriting data X with data Y may result in storing Y on a new memory division (e.g., rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media 122 may accumulate a significant amount of invalid data.

A groomer process may operate outside of the critical path for servicing storage operations. The groomer process may reclaim memory divisions so that they may be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller 124 may be further configured to store data in a log format. As described above, a log format refers to a data format that defines an ordered sequence of storage operations performed on a non-volatile memory media 122. In some embodiments, the log format comprises storing data in a pre-determined sequence of media addresses of the non-volatile memory media 122 (e.g., within sequential pages and/or erase blocks of the media 122). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller 124, using the log storage module 137 described below or the like, may maintain a current append point at a media address of the non-volatile memory device 120. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller 124 may identify the "next" available memory division (e.g., the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory media 122, and independently of other metadata. As discussed above, invalid data may not be removed from the non-volatile memory media 122 until the memory division comprising the data is reclaimed. Therefore, multiple "versions" of data having the same context may exist on the non-volatile memory media 122 (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

The storage management layer 130 may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

The storage management layer 130 comprises and/or is communicatively coupled to one or more non-volatile memory devices 120. The one or more non-volatile memory devices 120 may include different types of non-volatile memory devices including, but not limited to: solid-state storage devices, hard drives, SAN storage resources, or the like. The one or more non-volatile memory devices 120 may comprise one or more respective non-volatile memory media controllers 126 and non-volatile memory media 122. As illustrated in FIG. 1, The SML 130 may provide access to the one or more non-volatile memory devices 120 via a traditional block I/O interface 131. Additionally, the SML 130 may provide access to enhanced functionality (e.g., a large, virtual address space 134) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the one or more non-volatile memory devices 120 and/or the one or more non-volatile memory media controllers 126.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations the on one or more non-volatile memory devices 120. The SML 130 may maintain metadata 135 comprising any-to-any mappings between logical addresses and media locations, as described above.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122, which define an ordered sequence of storage operations performed on the one or more non-volatile memory devices 120, as described above.

The SML 130 may further comprise a non-volatile memory device interface 139 configured to transfer data, commands, and/or queries to the one or more non-volatile memory devices 120 over a bus 125, which may include, but is not limited to: a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 124 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 124 comprises one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on and/or read data from the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (e.g., a page of each element of non-volatile memory media 122).

The non-volatile memory controller 124 may comprise an SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (e.g., through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
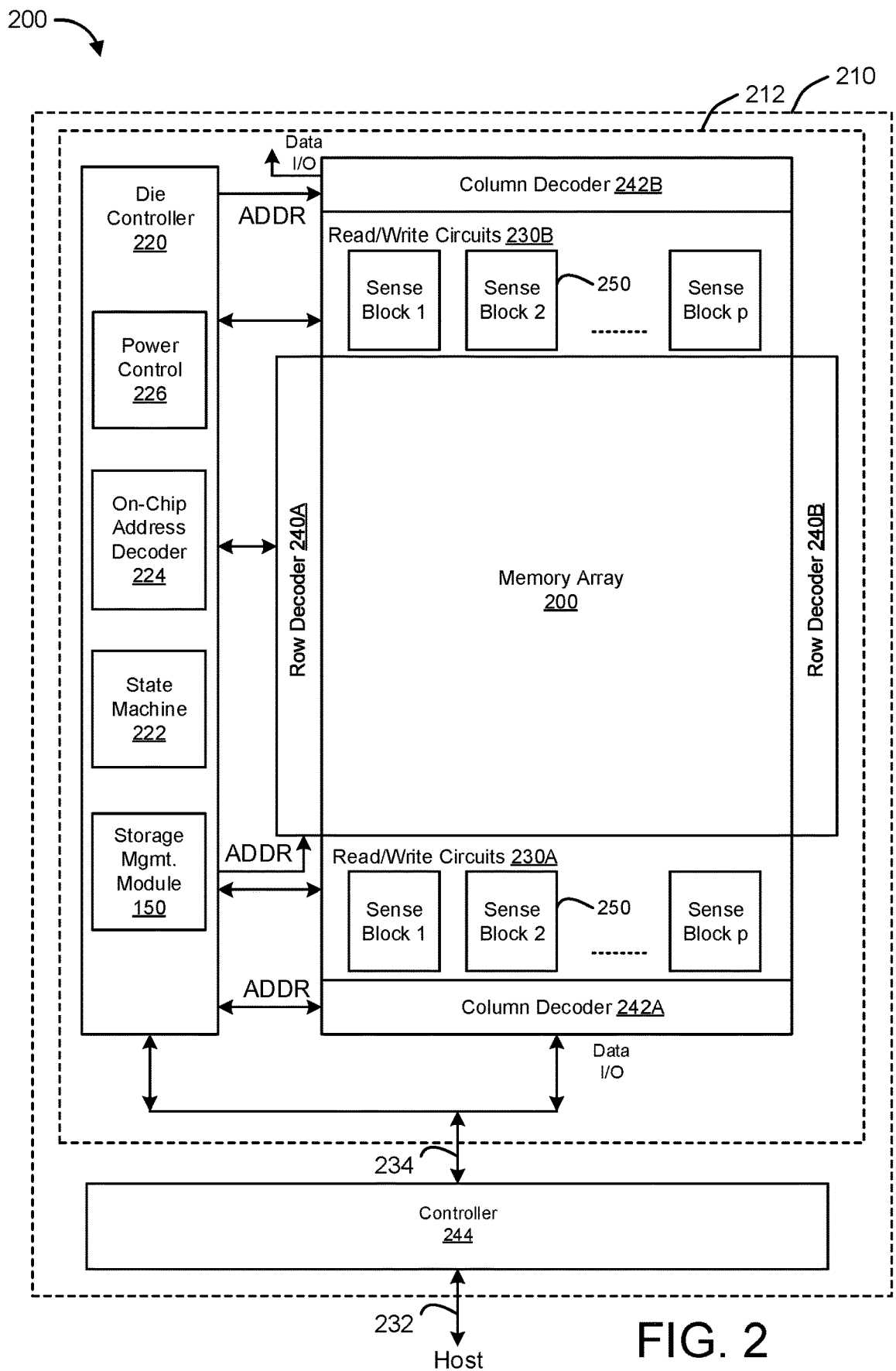
FIG. 2 is a schematic block diagram illustrating one embodiment of a memory element.

FIG. 2 depicts an embodiment of a non-volatile storage device 210 that may include one or more memory die or chips 212. The non-volatile storage device 210 may be substantially similar to the non-volatile memory device 120 described with reference to FIG. 1. Memory die 212, in some embodiments, includes an array 200 (two-dimensional or three dimensional) of memory cells, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation may include multiple chips 212.

Die controller 220, in one embodiment, cooperates with the read/write circuits 230A/230B to perform memory/storage operations on the memory array 200. The die controller 220, in certain embodiments, includes a storage management module 150, a state machine 222, an on-chip address decoder 224, and a power control circuit 226. The storage management module 150, in one embodiment, is configured to determine a total number of available erase blocks for the non-volatile storage device, determine numbers of the available erase blocks to assign to each of a plurality of logical storage blocks such that the numbers of erase blocks that are assigned to each of the logical storage blocks is within a variation threshold, percentage, amount, or the like, and generate the logical storage blocks by assigning the numbers of available erase blocks to the logical storage blocks. The storage management module 150, in certain embodiments, may include software of a device driver, and/or hardware in a device controller 244, a die controller 220 and/or state machine 222.

The state machine 222, in one embodiment, provides chip-level control of memory or storage operations. The on-chip address decoder 224 provides an address interface to convert between the address that is used by the host or a memory controller to the hardware address used by the decoders 240A, 240B, 242A, 242B. The power control circuit 226 controls the power and voltages supplied to the word lines and bit lines during memory operations. In one embodiment, power control circuit 226 includes one or more charge pumps that may create voltages larger than the supply voltage.

Figure 3:
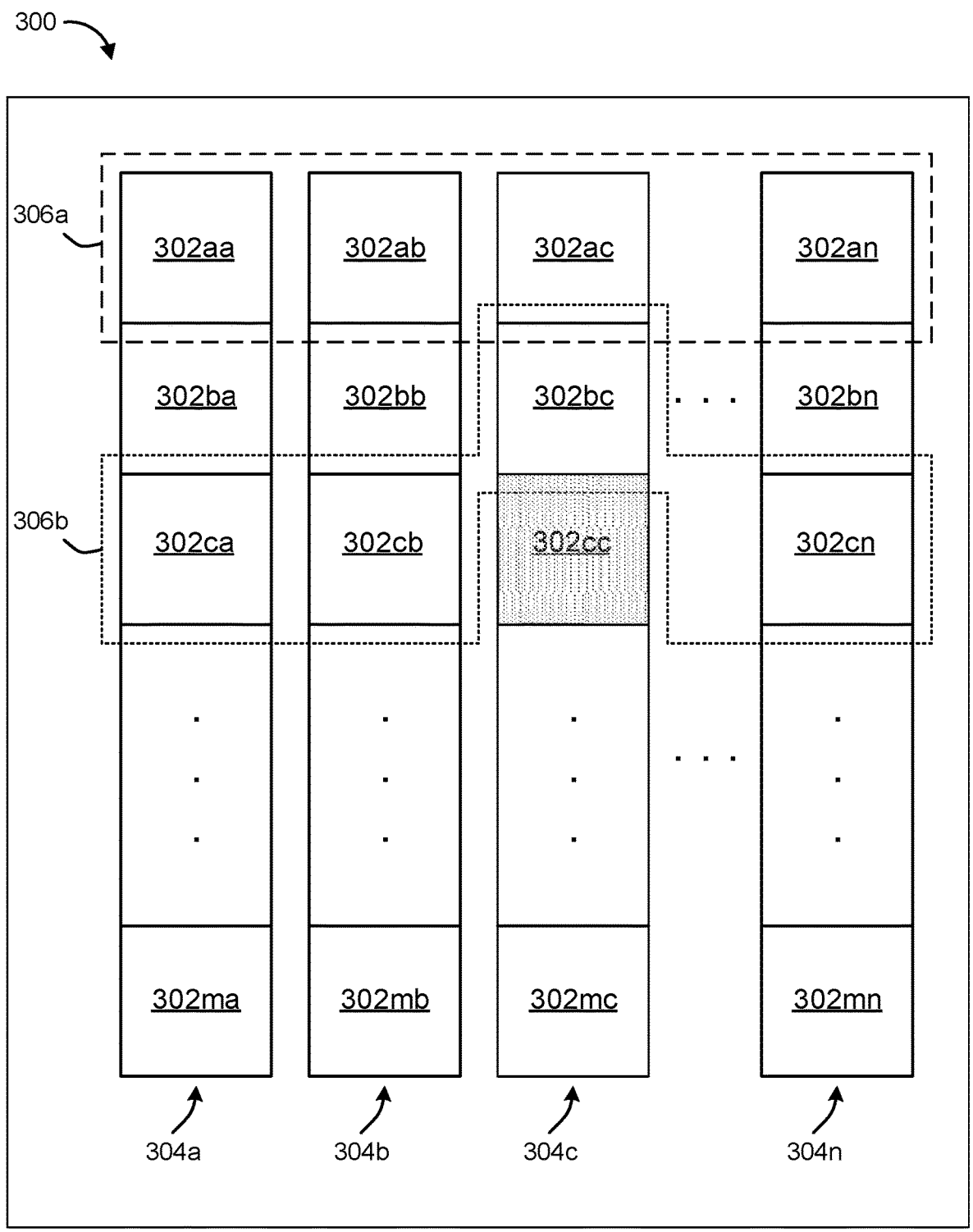
FIG. 3 is a schematic block diagram illustrating another embodiment of a memory element.

FIG. 3 depicts one embodiment of a non-volatile storage device 300, such as the non-volatile storage device 210 described above. The non-volatile storage device 300, in certain embodiments, is organized into erase blocks 302*aa*-302*mn* (collectively 302), which is the smallest erasable unit. The non-volatile storage device 300 may further be organized into pages, which, as used herein, may be the smallest unit that may be programmed or read. In some embodiments, the non-volatile storage device 300 includes multiple physical storage units 304*a*-*n* (collectively 304) (e.g., one or more dies, die planes, chips, integrated circuits, and/or the like), where each physical storage unit 304 has multiple erase blocks 302. Memory locations (e.g., erase blocks 302, pages of erase blocks, or word lines of erase blocks) from corresponding physical storage unit 304 may be grouped together to form logical storage blocks 306, virtual storage blocks, super blocks, and/or the like. Each memory location of the non-volatile storage device 300 may be addressed using a physical address (e.g., a physical page address or physical block address).

As described above, physically a storage block in the non-volatile storage device 300 may include an array of memory cells aligned in rows corresponding to word lines. The memory cells of a storage block may be configured as single-level cells ("SLC") or multi-level cells ("MLC"), and each word line in the storage block may be configured for use in storing one page (in an SLC case) or multiple pages (in an MLC case). Thus, the number of pages in a given storage block may be based on the number of bits stored per memory cell. Due to the increased density of storage, a storage block being used as a 2-bit MLC storage block may include twice the number of pages as when the same storage block is being used as a SLC storage block. For example, for a storage block composed of 64 word lines, the storage block may include 64 pages when used as a SLC storage block, 128 pages when used as a 2-bit MLC storage block, 192 pages when used as a 3-bit MLC storage block, and so on. These numbers, however, are merely illustrative and a storage block of the non-volatile storage device 300 may include any other suitable number of pages.

In one embodiment, the non-volatile storage device 300 includes one or more logical storage blocks 306, super blocks, virtual storage blocks, and/or the like. As used herein, the logical storage blocks 306 are storage units of the non-volatile storage device 300 that include erase blocks 302 from one or more different physical storage units 304 including different dies, die planes, chips, integrated circuits, and/or the like. In certain embodiments, logical storage blocks 306 provide operational parallelism, thereby enabling programming, reading, and erase operations to be performed on memory locations located in different physical storage units 304 such as different dies, die planes, chips, and/or the like, in parallel. Each logical storage block 306 may therefore belong to a particular bank or be a concurrently addressable unit ("CAU"). In some cases, a system may access a particular logical storage block by changing the state of a chip enable ("CE") signal.

In some embodiments, a logical storage block 306 may include one erase block 302 from each physical storage unit 304 that have the same position in the physical storage unit 304, or the same block number. For example, as shown in FIG. 3, a logical storage block 306a may include erase blocks 302 at block position "a" from each of the physical storage units 304a-n. Similarly, another logical storage block 306b may include erase blocks 302 at block position "b", "c", and so forth, from each of the physical storage units 304a-n.

In various embodiments, a logical storage block 306 may be comprised of erase blocks 302 at different block numbers of different physical storage units 304. For example, a logical storage block 306b may be comprised of erase blocks 302 at locations "ca," "cb," "bc," and so on. In such an embodiment, an erase block 302cc of a physical storage unit 304c from block position "c" may be a bad block, meaning that the erase block 302cc may not be available or useable for reading or writing data. Accordingly, the logical storage block 306b may include a good erase block 302bc from a different block location of the same physical storage unit 304c that the bad block 302cc is located on.

In certain embodiments, a logical storage block 306 may be formed by virtually linking or "striping" together a subset of memory locations of the erase blocks 302 (e.g., instead of or in addition to using entire erase blocks 302, for greater parallelism, in response to retiring or marking partial erase blocks as bad, or the like). For instance, a logical storage block 306 may be formed by virtually linking or "striping" together a subset of memory locations of an erase block 302 from one or more physical storage units 304 of the non-volatile storage device 300. The subset of memory locations may comprise the same one or more pages or word lines of different physical storage units 304 to be virtually linked as a logical storage block 306. In other embodiments, as described above, complete erase blocks from different die, die planes, chips, or other locations may be grouped to form a logical storage block 306 (e.g., with no sub-block striping).

The storage management module 150, the SML 130, and/or the like, may track and/or manage the memory locations of the erase blocks 302 that are associated with each logical storage block 306. For example, the storage management module 150 may store the association between memory locations of the erase blocks 302 and the corresponding logical storage blocks 306 as metadata on one or more pages of the non-volatile storage device 300.

Figure 4:
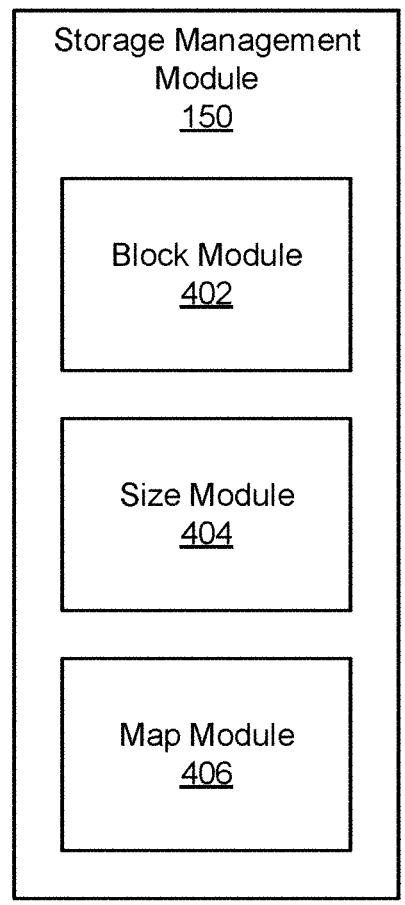
FIG. 4 is a schematic block diagram illustrating one embodiment of a storage management module.

FIG. 4 depicts one embodiment of a storage management module 150. The storage management module 150 may be substantially similar to the storage management module 150 described above with regard to FIGS. 1 and 2. In the depicted embodiment, the storage management module 150 includes a block module 402, a size module 404, and a map module 406, which are described in more detail below.

In one embodiment, the block module 402 identifies a pool of erase blocks 302 of a non-volatile storage device 300 and determines a total number of available erase blocks 302 of the non-volatile storage device 300. For example, the block module 402 may scan, test, check, and/or the like the erase blocks 302 of the non-volatile storage device 300 to determine which erase blocks 302 are available for reading and writing data (e.g., "good" blocks which have not been marked "bad", retired, or otherwise taken out of use). In another example, the block module 402 may maintain a list of erase blocks 302 for the non-volatile storage device 300 and may delete, mark as invalid, retire, or the like erase blocks 302 that are "bad" erase blocks 302 (e.g., erase blocks 302 that have errors, have failed, have been retired, and/or otherwise cannot be used for reading and/or writing data). Bad blocks may include erase blocks 302 that are determined to be defunct or defective when the storage device 300 is first used, formatted, and/or the like (e.g., during a die sort testing operation or the like), due to defects during the manufacture of the storage device 300, and/or erase blocks 302 that become defunct or defective during the lifetime of the storage device 300.

In certain embodiments, the block module 402 maintains a pool, list, or the like of available erase blocks 302 such as erase block locations (e.g., memory addresses for the available erase blocks 302, chip, die, and/or die plane identifiers, and/or the like) for the available erase blocks 302, erase block identifiers for the available erase blocks 302, and/or the like. In various embodiments, the block module 402 tracks, counts, or the like the total number of available erase blocks 302 that may be included in, assigned to, or otherwise associated with a logical storage block 306, a virtual storage block, a super block, and/or the like.

The size module 404, in one embodiment, is configured to determine, calculate, or the like numbers of available erase blocks 302 to include in each of a plurality of logical storage blocks 306. In some embodiments, the size module 404 determines numbers of available erase blocks 302 to include in each logical storage block 306 such that the "size" or numbers of available erase blocks 302 that are included in each logical storage block 306 deviates by a predefined threshold variance, a predetermined deviation limit, or the like, which may be a percentage, an amount or number of erase blocks 302, and/or the like.

For instance, the size module 404 may determine the numbers of available erase blocks 302 to include in each logical storage block 306 such that the sizes of the logical storage blocks 306 deviate or vary from each other by at most 50%, 25%, 10%, 5%, 2%, or the like. In various embodiments, the size module 404 determines the numbers of available erase blocks 302 to include in each logical storage block 306 such that the sizes of the logical storage blocks 306 deviate or varies within the ranges of 0%-5%, 5%-15%, 15%-25%, 25%-50%, and/or the like. Similarly, the size module 404 may determine the numbers of available erase blocks 302 to include in each logical storage block 306 such that the sizes of the logical storage blocks 306 deviates or varies by at most one erase block 302, two erase blocks 302, three erase blocks 302, and so on.

In one embodiment, to determine the numbers of available erase blocks 302 to include in each logical storage block 306 such that the sizes of the logical storage blocks 306 deviates or varies by the threshold variance, the size module 404 calculates the number of logical storage blocks 306 that may be created so that as many available erase blocks 302 may be included in each logical storage block 306 as possible while maintaining the size limit set by the threshold variance. For example, if the logical storage blocks 306 may include 64 erase blocks 302, and there are 192 (64×3) available erase blocks 302, then the size module 404 may determine that three logical storage blocks 306 may be created that each include 64 erase blocks 302 so that there are no erase blocks 302 remaining.

However, if there are 190 available erase blocks 302, then instead of creating two logical storage blocks 306 that each include 64 erase blocks 302 and a third logical storage block 306 that includes 62 erase blocks 302, the size module 404 may determine that one logical storage block 306 should include 64 erase blocks 302 and the remaining two logical storage blocks 306 should each include 63 erase blocks 302 so that the logical storage blocks 306 are substantially even or the same size, which may be determined based on the threshold variance.

In one embodiment, the map module 406 generates a plurality of logical storage blocks 306 for a non-volatile storage device 300 by assigning the numbers of erase blocks 302 that the size module 404 determines to each of the logical storage blocks 306. For instance, the map module 406 may create, maintain, and/or otherwise manage a map of erase blocks 302 to the logical storage blocks 306 that the erase blocks 302 are assigned to.

In one embodiment, the map module 406 randomly assigns erase blocks 302 to logical storage blocks 306. In certain embodiments, the map module 406 assigns erase blocks 302 to logical storage blocks 306 in a sequential order such as the order of the dies, die planes, chips, or the like that the erase blocks 302 are located on. In a further embodiment, the map module 406 assigns erase blocks 302 to logical storage blocks 306 as a function of an age of each of the erase blocks 302.

As used herein, the age of an erase block 302 may refer to the total time that the erase block 302 has been activated or actively in use, the time since the erase block 302 was manufactured, the number of program/erase cycles that have been performed on the erase block 302, and/or the like. In such an embodiment, the map module 406 includes erase blocks 302 in a logical storage block 306 by selecting erase blocks 302 that have a lower age than erase blocks 302 that have a higher age, e.g., in sequential order of age.

In certain embodiments, the map module 406 selects erase blocks 302 to assign to a logical storage block 306 as a function of the ages of the erase blocks 302 such that the average age of the erase blocks 302 of the logical storage block 306 satisfies a predetermined age threshold. In this manner, the map module 406 may manage the "ages" of logical storage blocks 306 such that the ages of the logical storage blocks 306 are substantially the same instead of ages of particular logical storage blocks 306 being substantially lower or higher than the ages of different logical storage blocks 306. In various embodiments, if possible, the map module 406 assigns all, or substantially all, of the available erase blocks 302 to logical storage blocks 306 according to the threshold variance such that there are no, or very few, unassigned erase blocks 302 of the available erase blocks 302 that could be assigned to the logical storage blocks 306.

Figure 5:
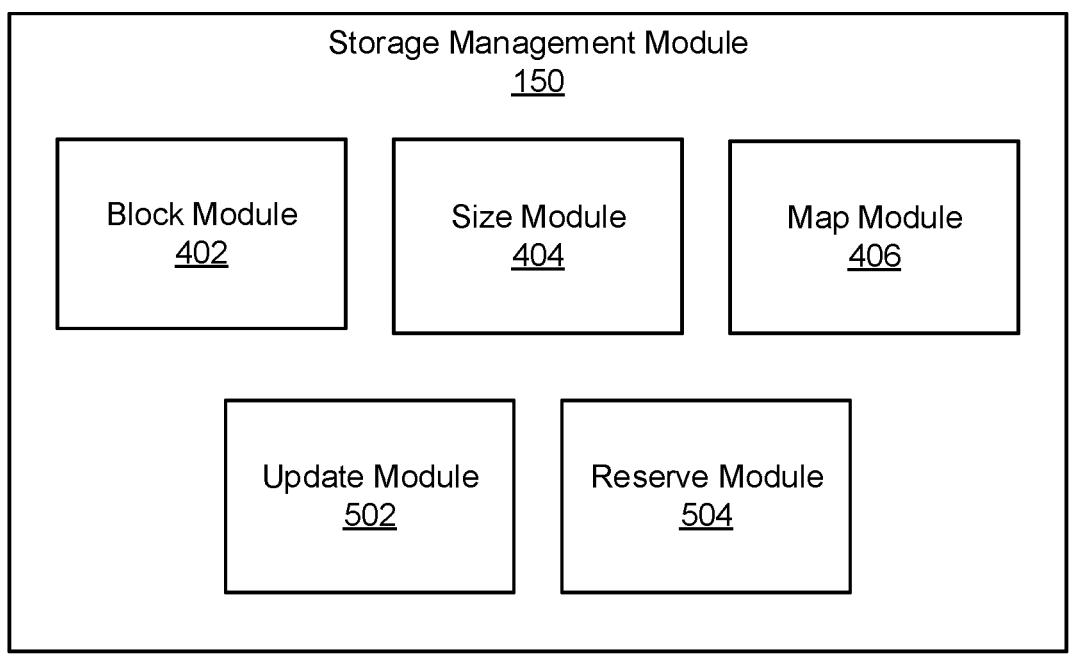
FIG. 5 is a schematic block diagram illustrating another embodiment of a storage management module.

FIG. 5 depicts one embodiment of a storage management module 150. The storage management module 150 may be substantially similar to the storage management module 150 described above with regard to FIGS. 1, 2, and 4. In the depicted embodiment, the storage management module 150 includes a block module 402, a size module 404, and a map module 406, which may be substantially similar to the block module 402, the size module 404, and the map module 406 described above with reference to FIG. 4. Furthermore, in one embodiment, the storage management module 150 includes an update module 502 and a reserve module 504, which are described in more detail below.

In one embodiment, the update module 502 is configured to track, detect, monitor, determine, calculate, and/or the like a refresh condition associated with each logical storage block 306 of the non-volatile storage device 300. In some embodiments, the logical storage blocks 306 need to be periodically refreshed, adjusted, modified, resized, and/or the like due to changes in the erase blocks 302 that are included in the logical storage blocks 306. For example, erase blocks 302 may go bad so that they cannot be read or written to. The update module 502, in various embodiments, monitors for refresh various refresh conditions that may trigger a dynamic, real-time resizing, reconfiguration, modification, re-generation, re-mapping, and/or the like of the logical storage blocks 306.

In certain embodiments, the refresh condition that the update module 502 tracks includes a program/erase cycle count for the erase blocks 302 of a logical storage block 306 (e.g., every 32 program/erase cycles), an age of the logical storage block 306 (e.g., the average age of the erase blocks 302 that are included in the logical storage block 306), an error rate measurement such as a failed bit count for the erase blocks 302 of the logical storage blocks 306, and/or the like. The update module 502 may periodically check the status of the erase blocks 302 for each logical storage block 306 to actively monitor for refresh conditions at certain intervals, may detect events that trigger monitoring of the logical storage blocks 306 (e.g., such as a failed read or write on an erase block 302 that may indicate that the erase block 302 is bad), and/or the like.

In response to one or more of the refresh conditions satisfying a predefined threshold, e.g., in response to the program/erase cycle count for an erase block 302 of a logical storage block 306 satisfying a threshold program/erase cycle count, the age of the logical storage block 306 satisfying an age threshold for the logical storage blocks 306, the failed bit count for the erase blocks 302 satisfying a failed bit count threshold, the update module 502 dissolves, removes, invalidates, cancels, and/or the like the logical grouping of erase blocks 302 that are included in the logical storage blocks 306.

The update module 502 and/or the map module 406, for instance, may delete, remove, invalidate, and/or the like the mapping of erase blocks 302 to the logical storage blocks 306 that the erase blocks 302 were assigned to in response to the update module 502 detecting the refresh condition. The update module 502, in another example, may remove, invalidate, mark as deleted, delete, and/or the like references, pointers, or other means to access a logical storage block 306 to dissolve the logical storage block 306 so that the logical storage block 306 cannot be used for reading data from and/or writing data to the non-volatile storage device 300.

In certain embodiments, after the update module 502 has dissolved the logical storage blocks 306, the erase blocks 302 that make up the logical storage blocks 306 are returned to the available pool of erase blocks 302. In one embodiment, the block module 402 determines a new total number of available erase blocks 302 that are candidates for inclusion in new logical storage blocks 306. The new total number of available erase blocks 302 may be different than the original total number of available erase blocks 302 due to changes in the erase blocks, e.g., if some erase blocks 302 have gone bad or are otherwise no longer useable.

In certain embodiments, the size module 404 determines new numbers of erase blocks 302 to assign to logical storage blocks 306 based on the total number of erase blocks 302 in the pool of available erase blocks 302. In certain embodiments, the size module 404 determines the new numbers of erase blocks 302 to assign to logical storage blocks 306 such that the number of erase blocks 302 that are assigned to each logical storage block 306 is substantially the same or within a threshold variance such as 25% or less. The map module 406, in certain embodiments, generates new logical storage blocks 306 by assigning the candidate erase blocks 302 to the logical storage blocks 306 according to the numbers of erase blocks 302 that the size module 404 determined to include in each logical storage block 306, and updating the mapping of erase blocks 302 to the logical storage blocks 306 that the erase blocks 302 are assigned to. In this manner, the sizes of the logical storage blocks 306 may be dynamically adjusted in order to ensure that the numbers of erase blocks 302 that are assigned to each logical storage block 306 is within a threshold variance so that the sizes of the logical storage blocks 306 are substantially even and that most, if not all, of the available erase blocks 302 may be assigned to logical storage blocks 306.

In a further embodiment, the size module 404 determines the numbers of good, useable, or the like erase blocks 302 from each of the logical storage blocks 306 when the update module 502 dissolves each of the logical storage blocks 306. The size module 404, in one embodiment, stores the determined numbers of useable erase blocks 302 in a queue, which the map module 406 may use to assign erase blocks 302 to logical storage blocks 306. For example, if there are five logical storage blocks 306, and the number of useable erase blocks 302 included in each of the logical storage blocks 306 when the update module 502 dissolves the logical storage blocks 306 is 64, 63, 63, 64, 63, respectively, then the size module 404 may place each of the sizes in a queue (or other data structure, list, table, or the like). The map module 406 may then pop a number off the queue and assigns the popped-off number of erase blocks 302 to a new logical storage block 306. By tracking the sizes of the logical storage blocks 306 when they are dissolved may reduce the processing and time needed to calculate the numbers of erase blocks 302 to assign to the logical storage blocks 306.

In one embodiment, the reserve module 504 is configured to generate a reserve pool of erase blocks 302 that includes one or more of the available erase blocks 302 that are not assigned to logical storage blocks 306. For example, if an erase block 302 is not assigned to a logical storage block 306 because it would have caused the sizes of the logical storage blocks 306 to exceed the threshold variance, the reserve module 504 adds the unassigned erase block 302 to a pool of reserve erase blocks 302.

In some embodiments, the reserve module 504 assigns at least one of the erase blocks 302 from the pool of erase blocks 302 to each logical storage block 306 when the logical storage blocks 306 are generated. For instance, the map module 406, when selecting erase blocks 302 to assign to the logical storage blocks 306 when the logical storage blocks 306 are being generated or re-generated, may select at least one erase block 302 from the reserve pool of available erase blocks 302 to assign to each of the logical storage blocks 306 before assigning other erase blocks 302 to the logical storage blocks 306.

The erase blocks 302 placed in the reserve pool may not be used for a period of time because they are not assigned to logical storage blocks 306. Accordingly, the erase blocks 302 in the reserve pool may have different usage characteristics, such as a lower age, a lower P/E cycle count, a lower failed bit count rate, and/or the like. Thus, assigning erase blocks 302 from the reserve pool to one or more of the logical storage blocks 306, and if possible assigning at least one erase block 302 to each of the logical storage blocks 306, may be one way to provide wear-leveling for the logical storage blocks 306.

Below is one example of pseudocode for an algorithm for assigning erase blocks 302 to logical storage blocks 306 for building evenly, or substantially evenly, sized logical storage blocks 306 in the order of dies, die planes, or the like with the largest number of unassigned good erase blocks 302. In certain embodiments, the pseudocode below, and the storage management module 150 in general, may build evenly sized logical storage blocks 306 regardless of how the bad, e.g., unusable, erase blocks 302 are distributed across a die, die plane, chip, and/or the like.

```
bool compare_planes (const plane *first, const plane *second) {
  return (first->num_free_blocks( ) > second->num_free_blocks( ));
}
void assign_blocks_to_super_block(super_block *sblock, unsigned int target_ebs)
{
    std::list<plane*> ordered_planes = get_all_plane_arrays( );
    ordered_planes.sort(compare_planes);
    for(std::list<plane*>::iterator it=ordered_planes.begin( );
    (target_ebs>0) &&
    (it!=ordered_planes.end( )); ++it) {
        erase_block *eb = (*it)->use_next_free_block( );
        sblock->add_erase_block(eb);
        --target_ebs;
    } }
```

The following example variables and calculations, in various embodiments, may be used to set up the formation of the logical storage blocks 306:

Max_blocks_per_plane$_{int}$=die plane with the highest number of good erase blocks 302.

Total_eb$_{Sint}$=sum of all erase blocks 302 on all die in non-volatile storage device 300.

Ebs_per_superblock$_{float}$=((float) Total_ebs$_{int}$)/((float) Max_blocks_per_plane$_{int}$)

Small_ebs_per_superblock$_{int}$=(int) Ebs_per_superblock$_{float}$

Remainder$_{float}$=Ebs_per_superblock$_{float}$−((float) Small_ebs_per_superblock$_{int}$)

Num_larger$_{int}$=(int) (Remainder$_{float}$*((float) Max_blocks_per_plane$_{int}$))

In one embodiment, during the initial formation of the logical storage blocks 306, Num_larger$_{int}$ logical storage blocks 306 are built with (Small_ebs_per_superblock$_{int}$+1) target number of erase blocks 302 in them, then build the remaining logical storage blocks 306 with Small_ebs_per_superblock$_{int}$ target number of erase blocks 302 in them. When rebuilding, reconfiguring, re-generating, or the like the logical storage blocks 306, in one embodiment, the original number of erase blocks 302 that were in the dissolved logical storage blocks 306 is used as the target number of erase blocks 302 to repopulate the logical storage blocks 306 with. Furthermore, in certain embodiments, the reserve erase block 302 pool is used to rebuild the logical storage blocks 306 with the additional requirement of selecting the lowest age erase blocks 302 available from each plane.

Figure 6:
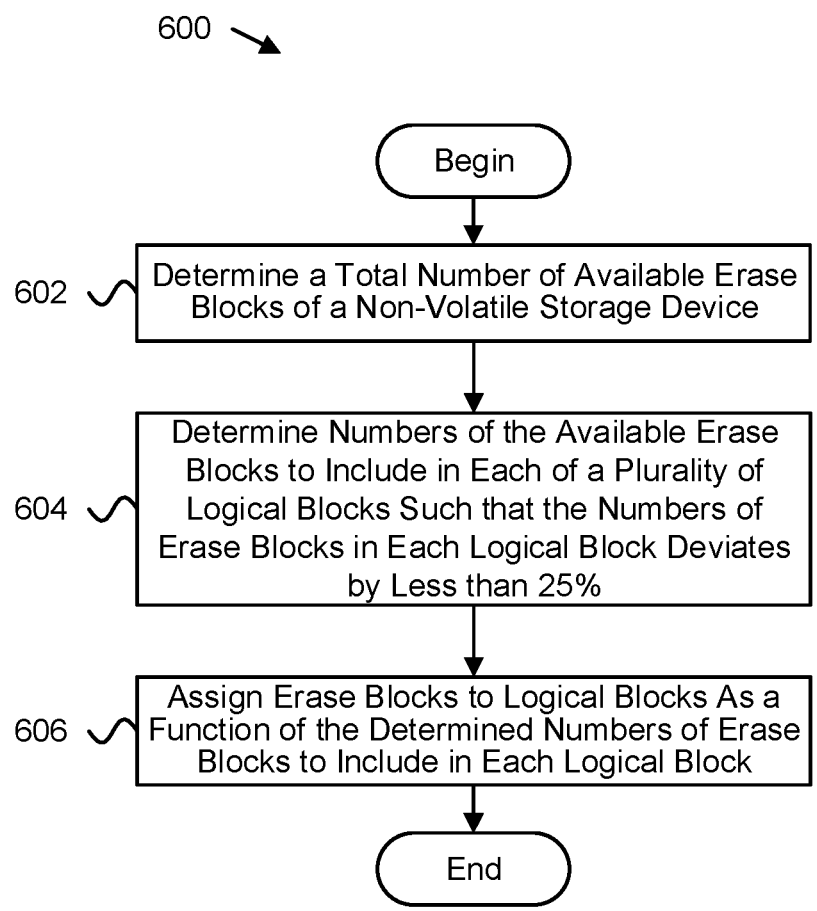
FIG. 6 is a schematic flow chart diagram illustrating one embodiment of a method for dynamically resizing logical storage blocks.

FIG. 6 depicts one embodiment of a method 600 for dynamically resizing logical storage blocks. In one embodiment, the method 600 begins and the block module 402 determines 602 a total number of available erase blocks 302 of a non-volatile storage device 300. The size module 404, in some embodiments, determines 604 numbers of erase blocks 302 from the available erase blocks 302 to include in each of a plurality of logical storage blocks 306 as a function of the total number of available erase blocks 302 such that the numbers of erase blocks 302 for each of the logical storage blocks 306 deviates from each other by less than 25%. The map module 406, in further embodiments, assigns 606 the determined numbers of erase blocks 302 to each of the logical storage blocks 306 that are generated for the non-volatile storage device 300, and the method 600 ends.

Figure 7:
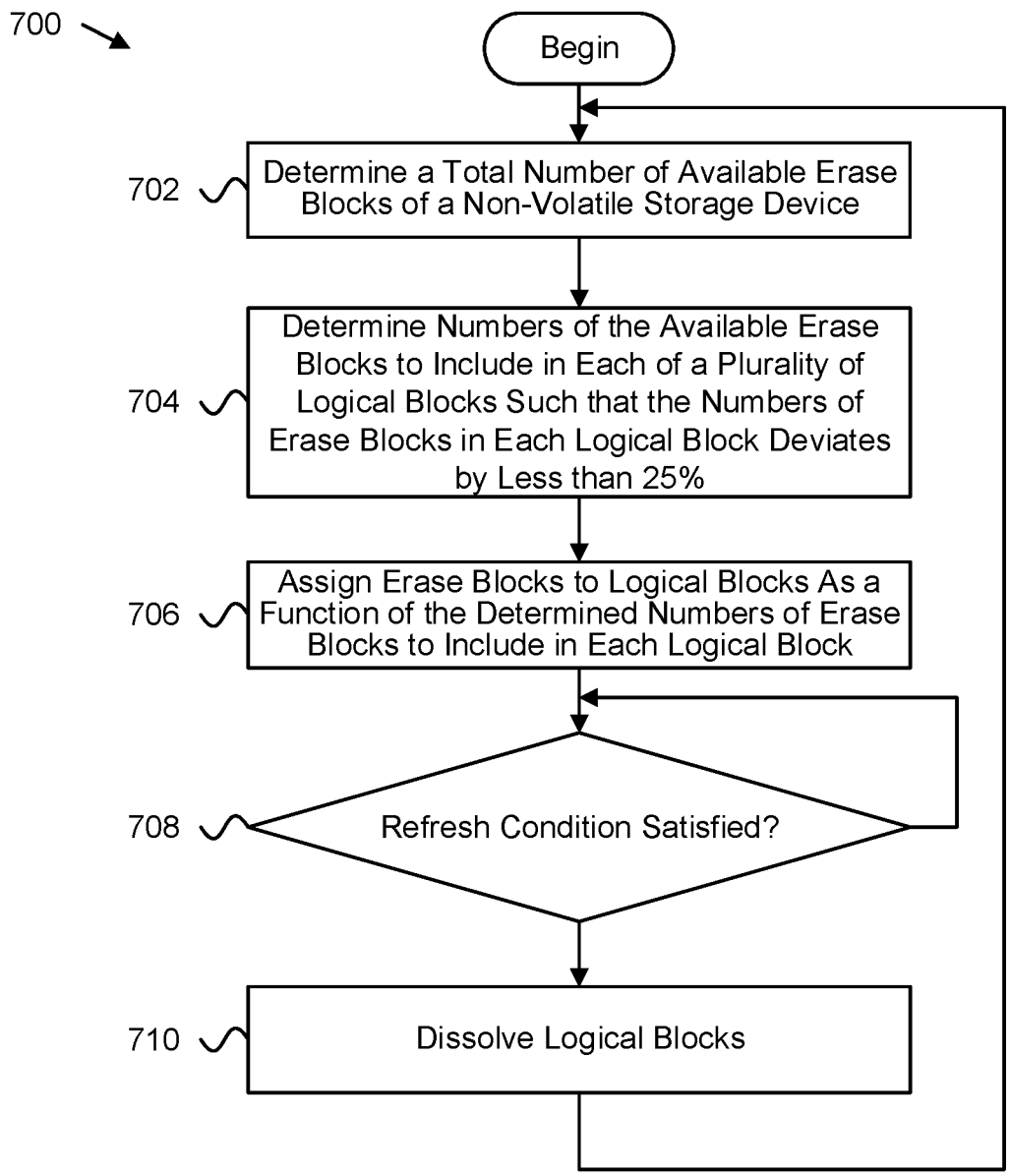
FIG. 7 is a schematic flow chart diagram illustrating a further embodiment of a method for dynamically resizing logical storage blocks.

FIG. 7 depicts one embodiment of a method 700 for dynamically resizing logical storage blocks. In one embodiment, the method 700 begins and the block module 402 determines 702 a total number of available erase blocks 302 of a non-volatile storage device 300. The size module 404, in some embodiments, determines 704 numbers of erase blocks 302 from the available erase blocks 302 to include in each of a plurality of logical storage blocks 306 as a function of the total number of available erase blocks 302 such that the numbers of erase blocks 302 for each of the logical storage blocks 306 deviates from each other by less than 25%. The map module 406, in further embodiments, assigns 706 the determined numbers of erase blocks 302 to each of the logical storage blocks 306 that are generated for the non-volatile storage device 300.

In one embodiment, the update module 502 determines 708 whether a refresh condition has been satisfied, such as a program/erase cycle count of one or more erase blocks 302 or logical storage blocks 306 satisfying a threshold program/erase cycle count, an age of a logical storage block 306 satisfying a threshold age, a failed bit count of one or more erase blocks 302 or logical storage blocks 306 satisfying a threshold failed bit count, and/or the like. In certain embodiments, if the update module 502 determines 708 that a refresh condition has not been satisfied, then the update module 502 continues to determine 708 whether a refresh condition has been satisfied. If the update module 502 determines 708 that a refresh condition has been satisfied, then the update module 502 dissolves 710 the logical storage blocks 306, and the block module 402 determines 702 a total number of erase blocks 302 that are available to re-generate the logical storage blocks 306.

Figure 8A:
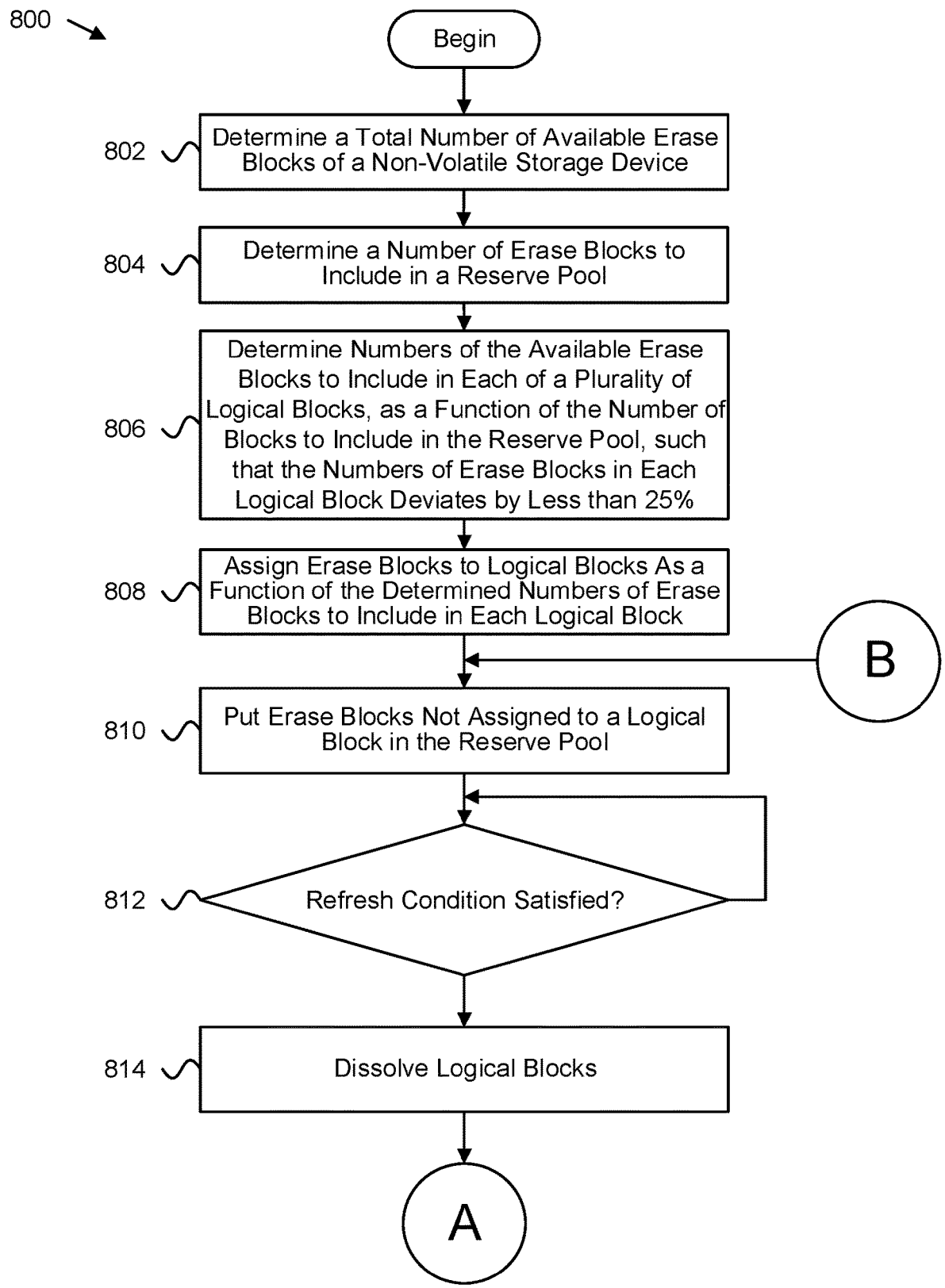
FIG. 8A is a schematic flow chart diagram illustrating another embodiment of a method for dynamically resizing logical storage blocks.
Figure 8B:
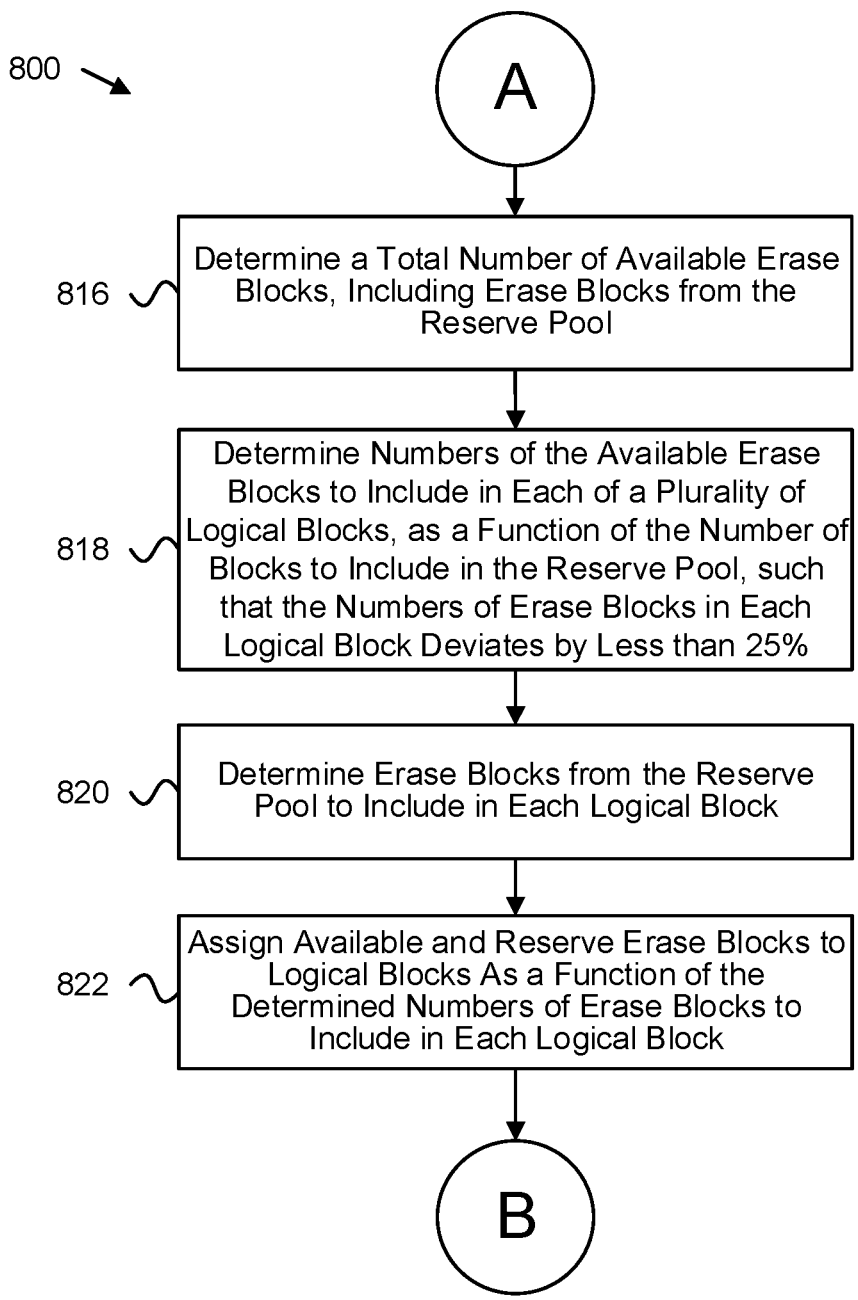
FIG. 8B is a schematic flow chart diagram illustrating a further embodiment of a method for dynamically resizing logical storage blocks.

FIG. 8A and FIG. 8B depict one embodiment of a method 800 for dynamically resizing logical storage blocks. In one embodiment, the method 800 begins and the block module 402 determines 802 a total number of available erase blocks 302 of a non-volatile storage device 300. In certain embodiments, the reserve module 504 determines a number of erase blocks 302 to include in a reserve pool, which may be selected from during re-generation of the logical storage blocks 306. The reserve module 504, for instance, may place a predetermined number of erase blocks 302 in the reserve pool to provide for wear-leveling of the non-volatile storage device 300 by preventing a number of erase blocks 302 from being used for a period of time.

The size module 404, in some embodiments, determines 806 numbers of erase blocks 302 from the available erase blocks 302 to include in each of a plurality of logical storage blocks 306 as a function of the total number of available erase blocks 302 such that the numbers of erase blocks 302 for each of the logical storage blocks 306 deviates from each other by less than 25%. The map module 406, in further embodiments, assigns 808 the determined numbers of erase blocks 302 to each of the logical storage blocks 306 that are generated for the non-volatile storage device 300.

In a further embodiment, the reserve module 504 places 810 erase blocks 302 that are not assigned to logical storage blocks 306 in the reserve pool. In one embodiment, the update module 502 determines 812 whether a refresh condition has been satisfied, such as a program/erase cycle count of one or more erase blocks 302 or logical storage blocks 306 satisfying a threshold program/erase cycle count, an age of a logical storage block 306 satisfying a threshold age, a failed bit count of one or more erase blocks 302 or logical storage blocks 306 satisfying a threshold failed bit count, and/or the like. In certain embodiments, if the update module 502 determines 812 that a refresh condition has not been satisfied, then the update module 502 continues to determine 812 whether a refresh condition has been satisfied. If the update module 502 determines 812 that a refresh condition has been satisfied, then the update module 502 dissolves 814 the logical storage blocks 306.

In one embodiment, the block module 402 (following "A" to FIG. 8B) determines 816 a total number of available erase blocks 302 of the non-volatile storage device 300, including the erase blocks 302 that are in the reserve pool. In further embodiments, the size module 404 determines 818 numbers of erase blocks 302 from the available erase blocks 302 to include in each of a plurality of logical storage blocks 306 as a function of the total number of available erase blocks 302 and the number of erase blocks 302 to include in the reserve pool, such that the numbers of erase blocks 302 for each of the logical storage blocks 306 deviates from each other by less than 25%.

In various embodiments, the map module 406 and/or the reserve module 504 determines 820 or selects erase blocks 302 from the reserve pool to include in each of the logical storage blocks 306, and the map module 406 assigns 822 the selected available and reserve erase blocks 302 as a function of the determined numbers of erase blocks 302 to include in each logical storage block 306. For example, if the numbers of erase blocks 302 to include in each logical storage block 306 is 62, and there are enough erase blocks 302 in the reserve pool such that one erase block 302 from the reserve pool may be included in each logical storage block 306, then the map module 406 selects 61 erase blocks 302 from the remaining available erase blocks 302 to include in each logical storage block 306 and one erase block 302 from the reserve pool so that the total number of erase blocks 302 in the logical storage block 306 is 62. The reserve module 504 (following "B" to FIG. 8A) puts 810 the unassigned erase blocks 302 in the reserve pool, and the update module 502 continues to monitor 812 for refresh conditions.

A means for determining a total number of available erase blocks 302 of a non-volatile storage device 300, in various embodiments, may include a block module 402, a storage management module 150, a non-volatile storage device interface 139, a non-volatile memory medium controller 126, a host computing device 110, a controller (e.g., a die controller 220, a state machine 222, a controller 244, a device driver, or the like), a processor 111, an FPGA, an ASIC, other logic hardware, and/or other executable code stored on a computer readable storage medium. Other embodiments may include similar or equivalent means for determining a total number of available erase blocks 302 of a non-volatile storage device 300.

A means for determining numbers of erase blocks 302 from the available erase blocks 302 to include in logical storage blocks 306 such that the numbers of erase blocks 302 in each of the logical storage blocks 306 is within a threshold variance, e.g., 25%, in various embodiments, may include a size module 404, a storage management module 150, a non-volatile storage device interface 139, a non-volatile memory medium controller 126, a host computing device 110, a controller (e.g., a die controller 220, a state machine 222, a controller 244, a device driver, or the like), a processor 111, an FPGA, an ASIC, other logic hardware, and/or other executable code stored on a computer readable storage medium. Other embodiments may include similar or equivalent means for determining numbers of erase blocks 302 from the available erase blocks 302 to include in logical storage blocks 306 such that the numbers of erase blocks 302 in each of the logical storage blocks 306 is within a threshold variance.

A means for assigning the determined numbers of erase blocks 302 to each of the logical storage blocks 306, in various embodiments, may include a map module 406, a storage management module 150, a non-volatile storage device interface 139, a non-volatile memory medium controller 126, a host computing device 110, a controller (e.g., a die controller 220, a state machine 222, a controller 244, a device driver, or the like), a processor 111, an FPGA, an ASIC, other logic hardware, and/or other executable code stored on a computer readable storage medium. Other embodiments may include similar or equivalent means for assigning the determined numbers of erase blocks 302 to each of the logical storage blocks 306.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
   a controller for a non-volatile storage device, the controller comprising:
      a block component configured to determine a total number of available erase blocks of the non-volatile storage device;
      a size component configured to determine numbers of erase blocks from the available erase blocks to include in each of a plurality of logical blocks as a function of the total number of available erase blocks, the numbers of erase blocks for each of the logical blocks deviating from each other by less than a predetermined deviation limit;
      a map component configured to generate the logical blocks for the non-volatile storage device by assigning the determined numbers of erase blocks to each of the logical blocks;
      a reserve component configured to maintain a reserve pool of available erase blocks that are not assigned to a logical block, the reserve pool sized to ensure that the numbers of erase blocks that are assigned to each of the logical blocks deviates by less than the predetermined deviation limit, the reserve pool comprising available erase blocks from each plane of the non-volatile storage device; and
      an update component configured to generate a new logical block in response to dissolving at least one of the plurality of logical blocks, the new logical block comprising one or more erase blocks from the at least one dissolved logical block and erase blocks from the reserve pool of available erase blocks such that the numbers of erase blocks for the new logical block satisfies the predetermined deviation limit relative to other logical blocks, the erase blocks from the reserve pool selected such that the new logical block comprises an erase block from each plane of the non-volatile storage device wherein the lowest age erase blocks that are available from each plane are selected for the new logical block.

2. The apparatus of claim 1, wherein the controller further comprises an update component configured to:
   track a refresh condition associated with each logical block, the refresh condition comprising one or more of a program/erase cycle count for the erase blocks of the logical block, an age of the logical block, and a failed bit count for the erase blocks of the logical block; and
   dissolve the logical grouping of erase blocks included in the logical block in response to determining one of:
      the program/erase cycle count satisfies a predetermined program/erase cycle threshold;
      the age of the logical block satisfies an age threshold for the logical blocks; and
      the failed bit count for the erase blocks satisfies a failed bit count threshold.

3. The apparatus of claim 2, wherein:
   the block component is further configured to determine a new total number of available erase blocks that are candidates for inclusion in new logical blocks in response to the update component dissolving the old logical blocks;
   the size component is further configured to determine new numbers of erase blocks from the available erase blocks to include in each of the new logical blocks as a function of the total number of available erase blocks such that the numbers of erase blocks for each of the new logical blocks deviates by less than the predetermined deviation limit; and
   the map component is further configured to generate the new logical blocks by assigning the determined new numbers of erase blocks to each of the new logical blocks.

4. The apparatus of claim 3, wherein the size component is further configured to:
   determine the number of erase blocks that are still useable from each of the dissolved logical blocks;
   store each number of erase blocks that are still usable from each of the dissolved logical blocks in a queue; and
   set, for each new logical block, the number of erase blocks to include in each new logical block to the next number of erase blocks popped off of the queue.

5. The apparatus of claim 1, wherein the reserve component is further configured to assign at least one of the erase blocks from the pool of erase blocks in each logical block when the logical blocks are generated.

6. The apparatus of claim 1, wherein the map component is further configured to assign each of the available erase blocks to logical blocks when the logical blocks are generated such that there are no unassigned erase blocks of the available erase blocks that can be assigned to logical blocks.

7. The apparatus of claim 1, wherein a logical block is comprised of a virtual grouping of erase blocks, the map component being further configured to maintain a mapping of erase blocks to the logical blocks that the erase blocks are assigned to, the mapping being updated in response to new logical blocks being generated.

8. The apparatus of claim 1, wherein the map component is further configured to select erase blocks to assign to the logical blocks as a function of an age of each of the erase blocks, erase blocks with a lower age being selected to be assigned to logical blocks before erase blocks with a higher age.

9. The apparatus of claim 8, wherein the age of an erase block is defined as one or more of a total time that the erase block is activated, a time since the erase block was manufactured, and a number of program/erase cycles that have been performed on the erase block.

10. The apparatus of claim 8, wherein the map component is further configured to select erase blocks to assign to the logical blocks as a function of the ages of the erase blocks such that the average ages of the erase blocks included in the logical blocks satisfies a predetermined age threshold.

11. The apparatus of claim 1, wherein the predetermined deviation limit is selected such that the numbers of erase blocks for each of the logical blocks deviates by at most one erase block.

12. The apparatus of claim 1, wherein the predetermined deviation limit comprises a percentage such that the numbers of erase blocks for each of the logical blocks deviates by less than twenty-five percent.

13. The apparatus of claim 1, wherein the non-volatile storage device comprises a plurality dies, each die comprising a plurality of planes, and each plane comprising a plurality of erase blocks, each logical block comprising erase blocks selected from each plane of the die, the erase blocks from each plane of the die being assigned to a logical block in a sequential order of the planes.

14. An apparatus comprising:
means for identifying a pool of erase blocks of a non-volatile recording medium to assign to a plurality of virtual blocks, each of the plurality of virtual blocks comprising a plurality of erase blocks that are logically combined to form a single storage unit of the non-volatile recording medium;
means for calculating sizes for each of the plurality of virtual blocks, the sizes defining a number of erase blocks to assign to each of the plurality of virtual blocks;
means for assigning erase blocks from the pool of erase blocks to each of the virtual blocks such that variations in sizes between each virtual block is less than twenty-five percent;
means for maintaining a reserve pool of erase blocks comprising identified erase blocks that are not assigned to the plurality of virtual blocks, the reserve pool sized to ensure that the sizes of the virtual blocks vary by less than twenty-five percent, the reserve pool comprising available erase blocks from each plane of the non-volatile recording medium; and
means for generating a new logical block in response to dissolving at least one of the plurality of logical blocks, the new logical block comprising one or more erase blocks from the at least one dissolved logical block and erase blocks from the reserve pool of available erase blocks such that the numbers of erase blocks for the new logical block satisfies the predetermined deviation limit relative to other logical blocks, the erase blocks from the reserve pool selected such that the new logical block comprises an erase block from each plane of the non-volatile recording medium wherein the lowest age erase blocks that are available from each plane are selected for the new logical block.

15. The apparatus of claim 14, further comprising:
means for tracking a refresh condition associated with each virtual block, the refresh condition comprising one or more of a program/erase cycle count for the erase blocks of the virtual block, an age of the virtual block, and a failed bit count for the erase blocks of the virtual block; and
means for dissolving the logical grouping of erase blocks included in the virtual block in response to determining one of:
the program/erase cycle count satisfies a predetermined program/erase cycle threshold;
the age of the virtual block satisfies an age threshold for the virtual blocks; and
the failed bit count for the erase blocks satisfies a failed bit count threshold.

16. The apparatus of claim 15, further comprising:
means for identifying a new pool of erase blocks to assign to new virtual blocks in response to the old virtual blocks being dissolved;
means for calculating sizes for each of the new virtual blocks; and
means for assigning erase blocks from the new pool of erase blocks to each of the new virtual blocks such that variations in sizes between each new virtual block is less than twenty-five percent.

17. The apparatus of claim 14, further comprising means for assigning erase blocks to virtual blocks as a function of the ages of the erase blocks such that the average ages of the erase blocks assigned to the virtual blocks satisfies a predetermined age threshold.

18. A system comprising:
a non-volatile memory device, the non-volatile memory device comprising a plurality of erase blocks; and
a controller for the non-volatile memory device, the controller performing operations for:
determining how many of the plurality of erase blocks are usable for creating super blocks, the super blocks comprising storage units of the non-volatile memory device that are comprised of a combination of a plurality of erase blocks;
generating a mapping of the usable erase blocks to the super blocks such that the number of usable erase blocks that are mapped to each of the super blocks varies by less than a threshold size;
periodically modifying the mapping of the useable erase blocks to the super blocks while ensuring that the number of usable erase blocks that are mapped to each of the super blocks varies by less than the threshold size;
maintaining a reserve pool of usable erase blocks that are not assigned to the super blocks, the reserve pool sized to ensure that the number of usable erase blocks that are assigned to each of the super blocks varies by less than the threshold size, the reserve pool comprising available erase blocks from each plane of the non-volatile memory device; and
generating a new logical block in response to dissolving at least one of the plurality of logical blocks, the new logical block comprising one or more erase blocks from the at least one dissolved logical block and at least one erase block from the reserve pool of available erase blocks such that the numbers of erase blocks for the new logical block satisfies the predetermined deviation limit relative to other logical blocks, the erase blocks from the reserve pool selected such that the new logical block comprises an erase block from each plane of the non-volatile memory device wherein the lowest age erase blocks that are available from each plane are selected for the new logical block.

* * * * *